United States Patent [19]
Aihara

[11] Patent Number: 4,864,604
[45] Date of Patent: * Sep. 5, 1989

[54] ELECTRONIC WRISTWATCH HAVING DIALING TONE GENERATOR

[75] Inventor: Toshiharu Aihara, Oome, Japan

[73] Assignee: Casio Computer Co., Ltd., Tokyo, Japan

[ * ] Notice: The portion of the term of this patent subsequent to Sep. 6, 2005 has been disclaimed.

[21] Appl. No.: 184,293

[22] Filed: Apr. 21, 1988

Related U.S. Application Data

[62] Division of Ser. No. 34,398, Apr. 2, 1987, Pat. No. 4,769,836.

[30] Foreign Application Priority Data

Apr. 7, 1986 [JP]  Japan ................................... 61-80351
Apr. 7, 1986 [JP]  Japan ................................... 61-80352

[51] Int. Cl.⁴ ...................... H04M 1/50; H04M 11/00
[52] U.S. Cl. .................................... 379/110; 379/361; 379/418
[58] Field of Search ............... 379/361, 353, 354, 356, 379/418, 110

[56] References Cited

U.S. PATENT DOCUMENTS

| | | | |
|---|---|---|---|
| 4,087,638 | 5/1978 | Hayes et al. | 179/2 E |
| 4,126,768 | 11/1978 | Grenzow | 179/90 B |
| 4,563,548 | 1/1986 | Misherghi et al. | 179/84 VF |
| 4,573,046 | 2/1986 | Pinnow | 340/825.56 |
| 4,727,570 | 2/1988 | Tarbouriech | 379/361 |
| 4,763,355 | 8/1988 | Cox | 379/110 |

*Primary Examiner*—Stafford D. Schreyer
*Attorney, Agent, or Firm*—Frishauf, Holtz, Goodman & Woodward

[57] ABSTRACT

A wristwatch equipped with a dialing tone generator employs a low-frequency oscillator as a reference signal oscillator. The reference signal is frequency-divided into first and second frequency-divided signals, the first frequency-divided signal being used to produce a low-frequency tone signal, the second frequency-divided signal being used to produce a high-frequency tone signal. Both these tone signals are rectangular waveforms which are filtered in corresponding low-pass filters, to output first and second sine-wave signals, which are then synthesized with each other to produce a desired dialing tone.

10 Claims, 11 Drawing Sheets

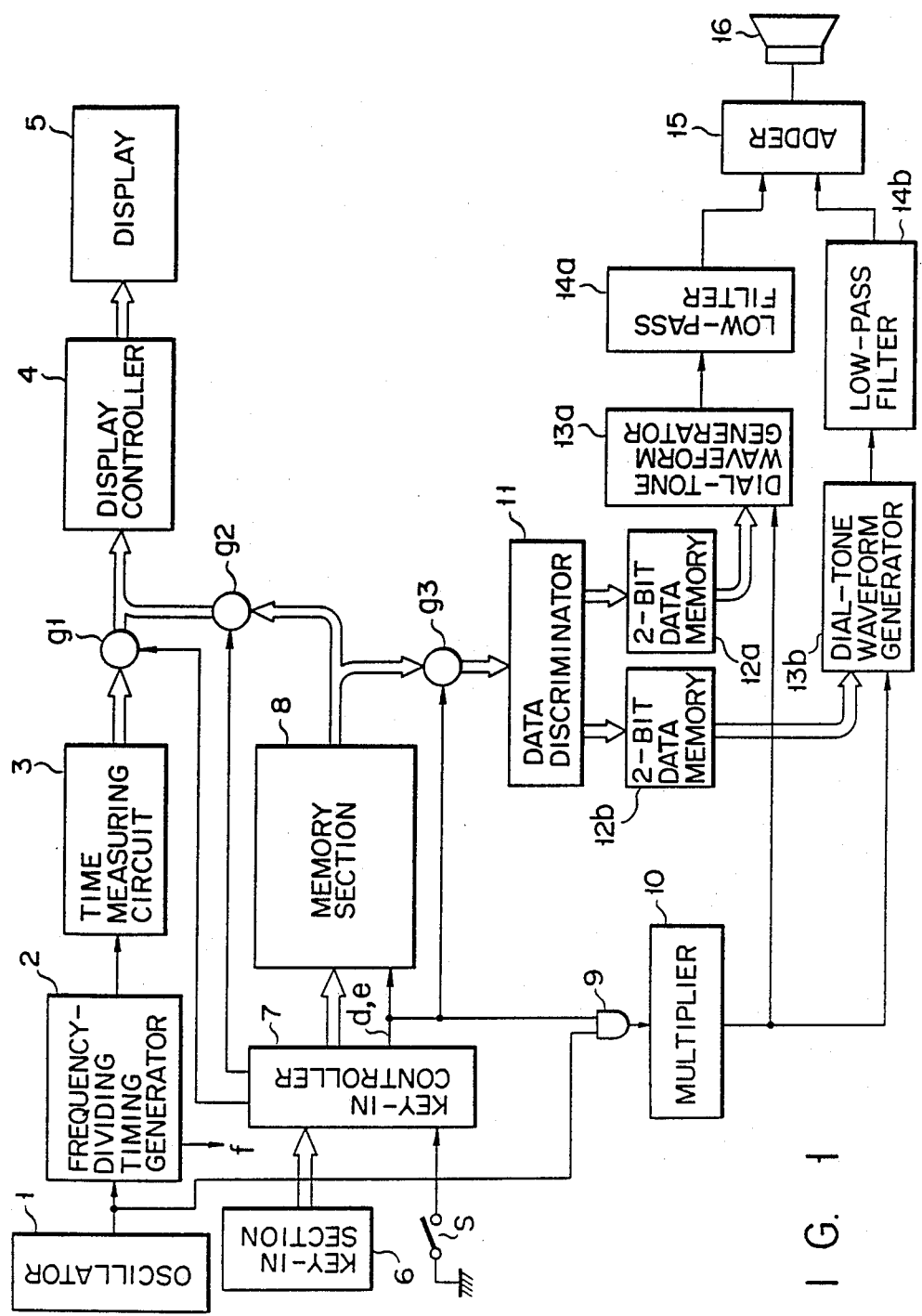
F I G. 1

F I G. 2A 1Hz 
F I G. 2B 8Hz 
F I G. 2C 8Hz 
F I G. 2D 
F I G. 4A 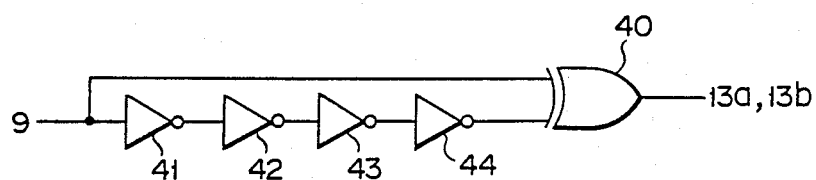
F I G. 4B 
F I G. 4C 
F I G. 4D 

F I G. 7A 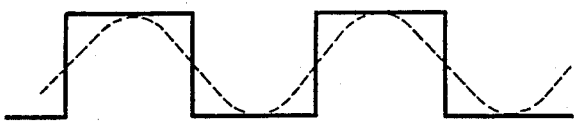
F I G. 7B 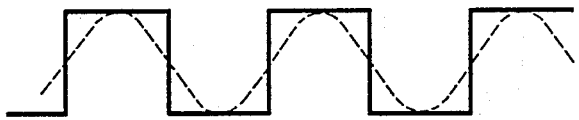
F I G. 8 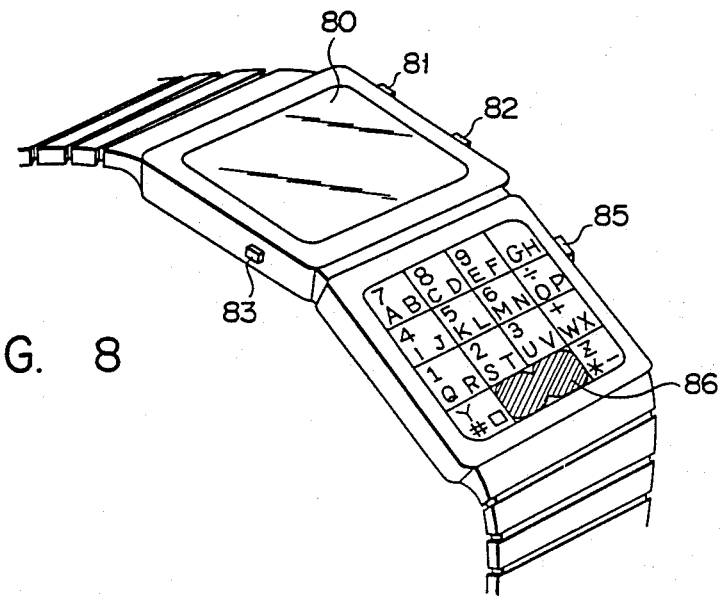
F I G. 9A 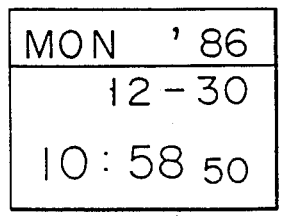
F I G. 9B 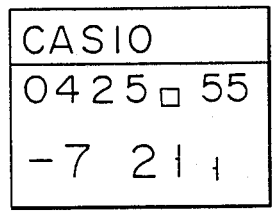
F I G. 9C 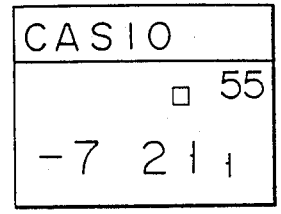

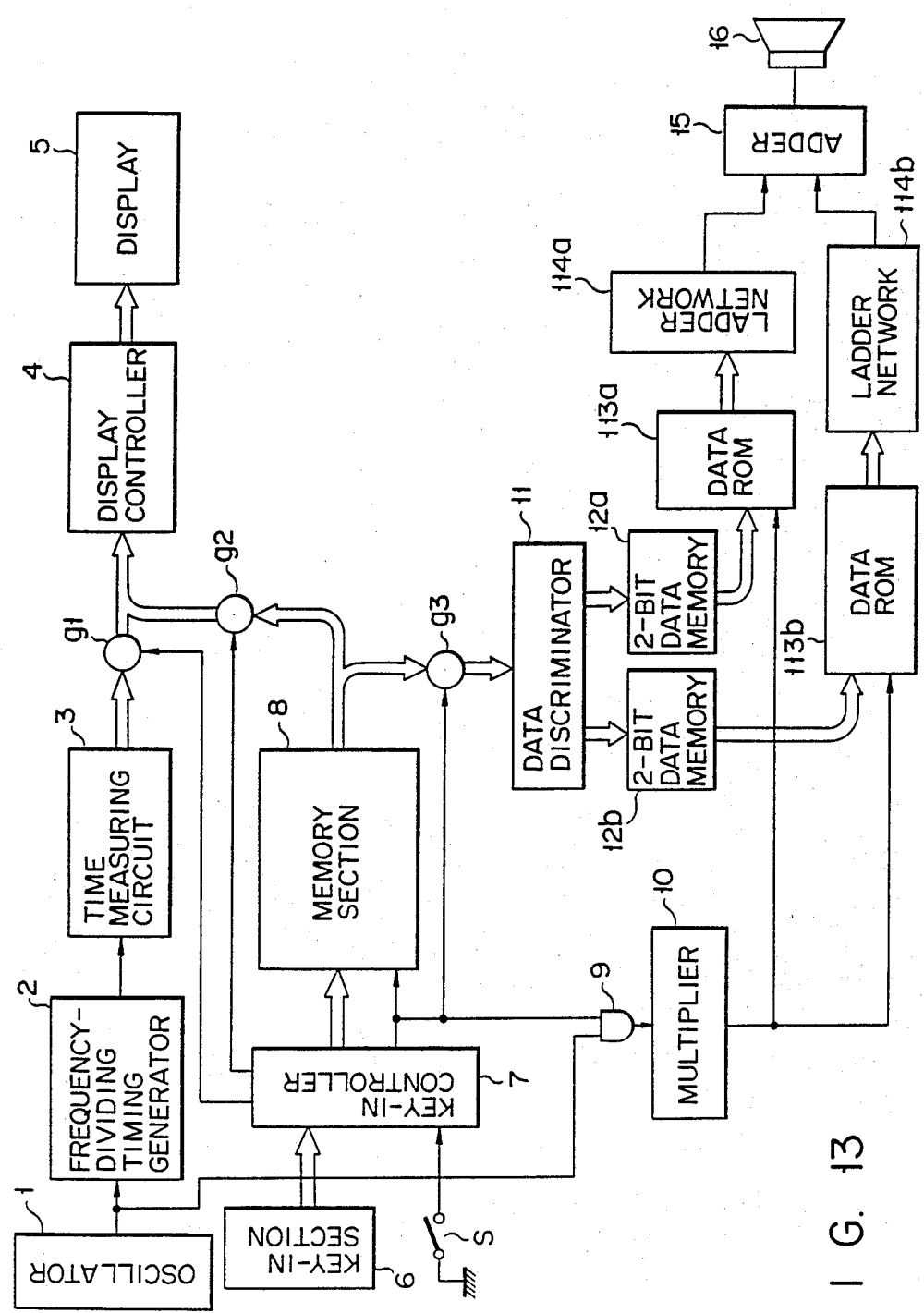
F I G. 13

F I G. 15A
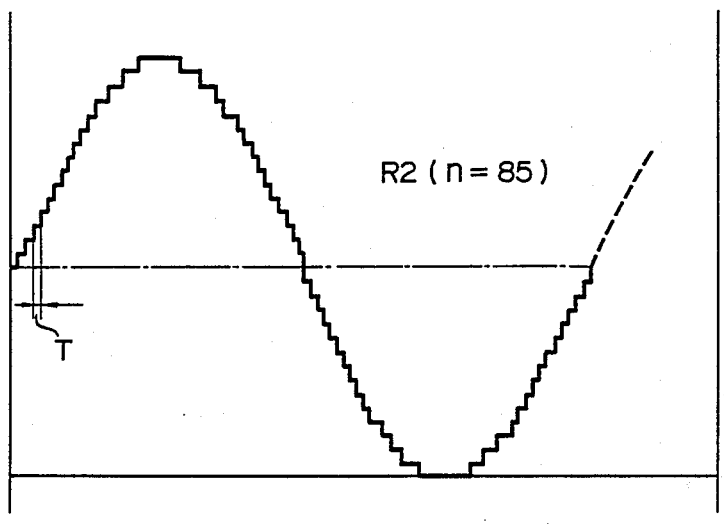
F I G. 15B
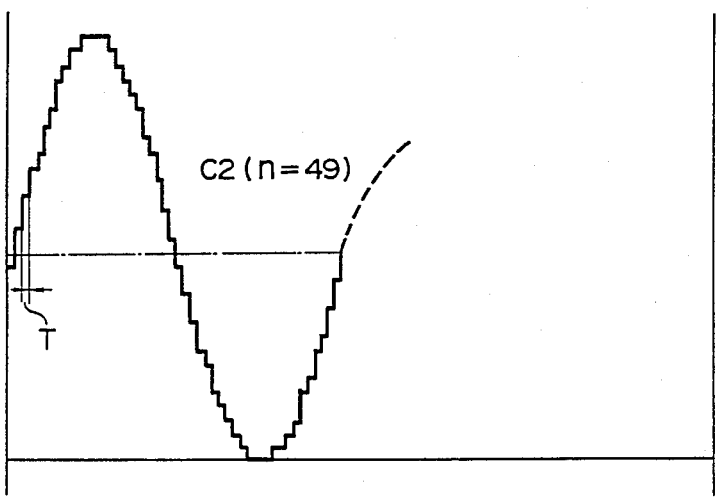

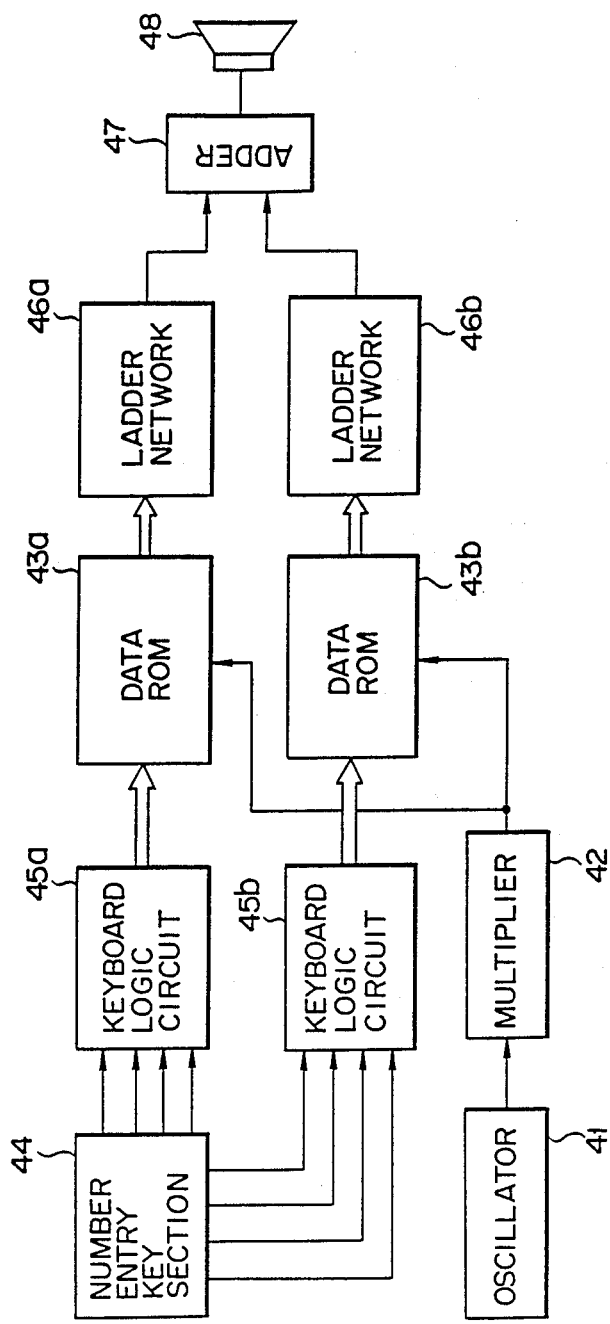

ELECTRONIC WRISTWATCH HAVING DIALING TONE GENERATOR

CROSS-REFERENCE TO THE RELATED APPLICATION

This patent application is a division of my U.S. patent application Ser. No. 034,398 now U.S. Pat. No. 4,769,836 that was entitled "DIALING TONE GENERATOR EMPLOYING LOW FREQUENCY OSCILLATOR" and was filed on Apr. 2, 1987.

BACKGROUND OF THE INVENTION

1. Field of the Invention

This invention relates to a dialing tone generator-equipped wristwatch for automatically converting a telephone number into a dialing tone signal and sending it to a push button telephone set, thereby calling a telephone of a second party.

2. Description of the related art

A dialing tone signal of a push button telephone set generally consists of a composite signal containing one of four low-frequency signals of 697 Hz, 770 Hz, 852 Hz, and 941 Hz and one of four high-frequency signals of 1209 Hz, 1336 Hz, 1477 Hz, and 1633 Hz.

In this case, each frequency signal is produced by dividing an oscillation frequency signal of an oscillator. In general, to obtain signals of different frequencies as described above, an oscillator with an extremely higher frequency than that of the dialing tone signal is required.

Table 1 below shows a frequency dividing ratio (N), a frequency (F/N), and a frequency error (ΔF%) of a known dailing tone generator for dividing an oscillation frequency signal of 3 MHz (precisely 3,579,545 Hz) to obtain dialing tone frequency signals as indicated by R1 to R4 and C1 to C4, respectively.

TABLE 1

| FREQ (Hz) | | | 3.579545 MHz | | |
|---|---|---|---|---|---|
| | | | F/N | N | ΔF % |
| Low | R1 | 697 | 699.1 | 160 × 32 | +0.30 |
| Fre- | R2 | 770 | 766.2 | 146 × 32 | −0.49 |
| quency | R3 | 852 | 847.4 | 132 × 32 | −0.54 |
| Group | R4 | 941 | 948.0 | 118 × 32 | +0.74 |
| High | C1 | 1209 | 1215.9 | 92 × 32 | +0.57 |
| Fre- | C2 | 1336 | 1331.7 | 84 × 32 | −0.32 |
| quency | C3 | 1477 | 1471.9 | 76 × 32 | −0.35 |
| Group | C4 | 1633 | 1645.0 | 68 × 32 | +0.73 |

Since this known dialing tone generator uses an extremely high-frequency signal such as 3 MHz, frequency errors with respect to the frequency signals as indicated by R1 to R4 and C1 to C4 are very few, but many frequency dividing stages are required. As a result, a bulky apparatus with great power consumption is required, and when a battery is used, a battery life will be shortened.

In addition, when the conventional dialing tone generator is incorporated in a small-sized electronic appliance, e.g., a wristwatch, a high-frequency oscillator such as a quartz oscillator of 3 MHz and man frequency dividing stages are additionally required. For this reason, current consumption is very increased to thereby shorten a battery life, and a device itself must be enlarged to allow space for the electronic circuit. Furthermore, if a typical oscillator (oscillation frequency F=32.768 [KHz]) incorporated in a normal electronic wristwatch and the like is utilized, a dialing tone frequency error caused by the oscillator falls outside a range of ±1.5% as an allowance value. More specifically, Table 2 below shows the case where a frequency of 32.768 KHz is utilized.

TABLE 2

| FREQ (Hz) | | | 32.768 KHz | | |
|---|---|---|---|---|---|
| | | | F/N | N | ΔF % |
| Low | R1 | 697 | 697.2 | 47 | +0.029 |
| Fre- | R2 | 770 | 762.0 | 42 | −1.04 |
| quency | R3 | 852 | 862.3 | 38 | +1.21 |
| Group | R4 | 941 | 936.2 | 35 | −0.51 |
| High | C1 | 1209 | 1213.6 | 27 | +0.38 |
| Fre- | C2 | 1336 | 1310.7 | 25 | −1.89 |
| quency | C3 | 1477 | 1489.5 | 22 | +0.85 |
| Group | C4 | 1633 | 1638.4 | 20 | +0.33 |

As compared with various parameters illustrated in Table 1, although a dividing ratio (N) is extremely small, conversely, a frequency error is large. For instance, an error becomes 1.89% with respect to a dialing tone frequency of 1336 Hz, and hence is not acceptable. In addition, errors with respect to dialing tone frequencies of 770 Hz and 852 Hz are extremely large.

Furthermore, in the conventional dialing tone generator, since frequency signals of dialing tone signals must be sine waves, a complex circuit for converting each frequency signal into a sine wave is required.

For example, U.S. Pat. No. 4,563,548 to Misherghi et al., issued on Jan. 7, 1986, describes a technique for obtaining sequentially increasing/decreasing data by an ALU (Arithmetic Logic Unit) and an accumulator and for converting digital data obtained by the ALU and the accumulator into a sine-wave signal by a D/A (Digital to Analog) converter so as to obtain a dialing tone signal. In addition, U.S. Pat. No. 4,087,638, issued to Hayes et al. on May 2, 1978, also describes another technique for converting sequentially increasing/decreasing digital data into a sine-wave signal by a D/A converter to obtain a dialing tone signal.

As described above, in these techniques wherein sequentially increasing/decreasing digital data is supplied to a D/A converter to obtain a dialing tone signal of a sine wave, different data must be prepared for the respective frequencies. Therefore, a circuit arrangement becomes very complex and fails to provide a compact device.

SUMMARY OF THE INVENTION

The present invention has been made in consideration of the above situation and has as its object to provide a dialing tone generator-equipped electronic wristwatch capable of obtaining a precise dialing tone signal with an extremely simple circuit, and capable of being incorporated in an electronic wristwatch with limited current consumption and a limited space.

To achieve the above object, there is provided a dialing tone generator-equipped electronic wristwatch, comprising:

oscillator circuit means for producing an oscillator frequency signal having a frequency of about 32 KHz;

time maasuring means for frequency-dividing the oscillator frequency signal from the oscillator circuit means to obtain time information;

display means for displaying the time information obtained by the time measuring means;

multiplier means for multiplying the oscillator frequency signal of about 32 KHz to derive a multiplier reference signal;

memory means for storing a plurality of telephone number data of the dialing numbers;

selection operation switch means for selecting desired telephone number data from the plurality of telephone number data in the memory means; and dialing tone signal generating means which, upon receipt of the telephone number data thus selected and multiplier reference signal, frequency-divides the multiplier reference signal and delivers an output dialing tone signal corresponding to the telephone number data.

With the above arrangement, according to the present invention, since there is no need to provide an oscillation element or an oscillation circuit for generating a 3 MHz signal, it is possible to provide a small mounting space and to adopt a simple circuit arrangement so that it can be incorporated into a wristwatch. Since it is not necessary to divide the oscillation frequency of the 3 MHz oscillation element and hence the oscillation circuit down into a dialing tone frequency, the wristwatch can save a dissipation power and hence assure a long life of a battery incorporated therein, so that there is no need for frequently replace one battery with another.

BRIEF DESCRIPTION OF THE DRAWINGS

FIG. 1 is a block diagram of a dialing tone generator-equipped electronic wristwatch showing an embodiment of the present invention;

FIGS. 2A, 2B, 2C, and 2D are views showing timing signals output from a frequency dividing timing generator of FIG. 1;

FIG. 4A is a detailed block diagram of a multiplier of FIG. 1;

FIGS. 4B to 4D are views showing output waveforms of each section of FIG. 4A;

FIGS. 7A and 7B are views showing signals output from the dial-tone signal waveform generator;

FIG. 8 is a schematic view of an electronic wristwatch incorporating the circuit of FIG. 1;

FIGS. 9A to 9C and FIG. 10 are views showing display states;

FIG. 13 is a block diagram of still another embodiment of the present invention;

FIGS. 15A and 15B are views showing output signals from the data ROM; and

FIG. 16 is a block diagram of still another embodiment of the present invention.

DETAILED DESCRIPTION OF THE PREFERRED EMBODIMENTS

Overall Circuit Arrangement

Figure 3:
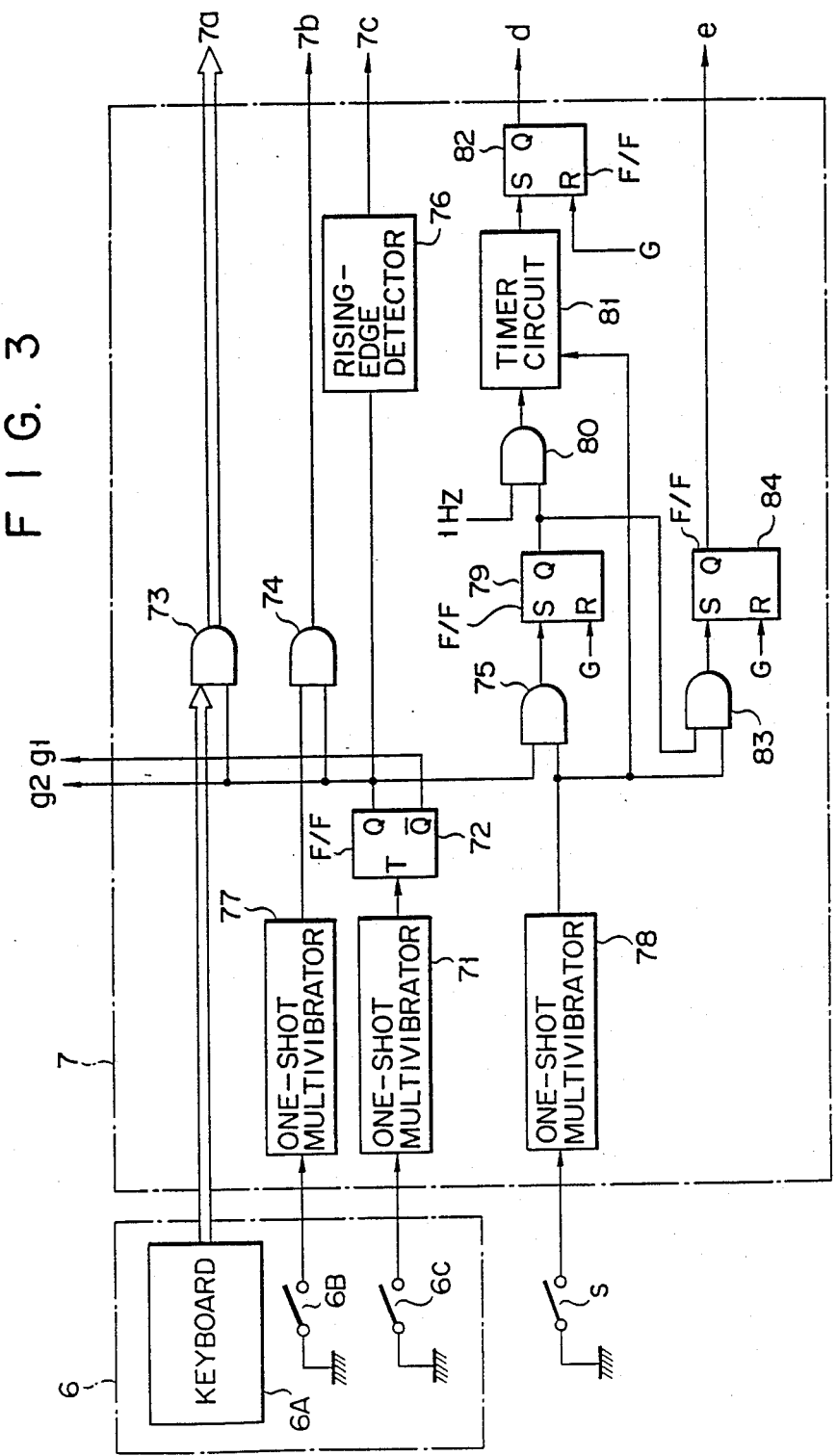
FIG. 3 is a block diagram showing details of a key-in section and a key-in controller of FIG. 1.

FIG. 1 is a block diagram showing an electronic wristwatch to which the present invention is applied. In FIG. 1, reference numeral 1 denotes an oscillator for outputting a clock signal of a frequency of 32.768 KHz used in a normal wristwatch. The clock signal output from oscillator 1 is supplied to frequency-dividing timing generator 2 and divided to a predetermined frequency, e.g., 1 second. Generator 2 outputs various timing signals f, in addition to the 1-sec (one second) signal, for controlling operation timings and the like of the entire circuit. FIG. 2A shows a 1-Hz pulse signal as an example of timing signals f; FIG. 2B, an 8-Hz pulse signal; and FIG. 2C, an 8-Hz rectangular wave (duty ratio ½) signal. Time measuring circuit 3 counts the 1-sec signal obtained by generator 2 to form time data of hour, minute, second, and the like. Time data is displayed on display 5 by display controller 4 when gate $g_1$ is enabled.

Key-in section 6 includes a plurality of keys for switching display modes or for inputting data, and key-in controller 7 is operated in accordance with a key-in operation. For example, when a time display mode is set by section 6, gate $g_1$ is enabled by controller 7, and time data is displayed on display 5, as described above. On the other hand, when a data input mode is set by section 6, data (e.g., a name and a telephone number) can be stored. That is, data input by section 6 are sequentially stored in predetermined areas of memory section 8 of, e.g., a RAM (Random Access Memory) by controller 7.

When a desired telephone number stored in section 8 is to be output as a dialing tone, a desired name is selected by section 6 first. Then, gate $g_2$ is enabled by controller 7, and the selected name and telephone number are read out from section 8 and displayed on display 5 through gate $g_2$. Thereafter, when switch S for outputting a dialing tone signal is operated, the desired telephone number is output from loudspeaker 16 as a dialing tone.

Key-In Controller

FIG. 3 shows detailed arrangements of section 6, switch S, and controller 7.

In FIG. 3, reference numeral 6A denotes a keyboard for inputting data of numerals, letters, and the like; 6B, a read switch for sequentially reading out data of names and telephone numbers stored in section 8; and 6C, a mode switch for switching a time display mode and a dialing tone output mode.

An operation signal of switch 6C is supplied to input terminal T of binary flip-flop 72 through one-shot multivibrator 71 of controller 7 so as to invert output signals from output terminals Q and $\overline{Q}$ thereof.

The output signal from terminal $\overline{Q}$ is supplied to gate $g_1$ as a gate enable signal, and the output signal from terminal Q is supplied gate $g_2$ as a gate enable signal. The output signal from terminal Q is supplied to AND gates 73, 74, and 75, respectively, as a gate control signal, and also supplied to rising edge detector 76.

Alphanumeric data keyed-in at keyboard 6A is supplied to gate 73, and alphanumeric data 7a output from gate 73 is supplied to section 8. An operation signal of switch 6B is supplied to gate 74 through multivibrator 77, and output signal 7b from gate 74 is supplied to section 8. Detector 76 detects that an out-. put signal from terminal Q rises from Low level to High level and outputs one-shot pulse 7c. Pulse 7c is also supplied to section 8.

In addition, an operation signal from switch S for outputting a dialing tone signal is supplied to gate 75 through one-shot multivibrator 78, and an output signal from gate 75 is supplied to set input terminal "S" of flip-flop 79. An output signal from terminal S of flip-flop 79 is supplied to AND gate 80, to which the 1-Hz signal shown in FIG. 2A is supplied to cause gate 80 to output the 1-Hz signal. The 1-Hz signal output from gate 80 is supplied to 3-second timer circuit 81. Circuit 81 counts the 1-Hz signals and outputs a carry signal so as to set flip-flop 82 when 3 seconds have passed. Output signal d from set output terminal Q of flip-flop 82 is supplied to gate g3 as a gate enable signal and also to AND gate 9 and section 8, as shown in FIG. 1.

In FIG. 3, an output signal from terminal Q of flip-flop 79 is also supplied to AND gate 83, and an output signal from gate 83 is supplied to set terminal S of flip-flop 84. Output signal e from set output terminal Q of flip-flop 84 is supplied to section 8 and dial-tone waveform generators 13a and 13b in FIG. 1, as will be described later. Note that in FIG. 3, an output signal from multivibrator 78 is supplied to circuit 81 as a reset signal, and flip-flops 79, 82, and 84 are reset by signal G (to be described later) from section 8.

Referring back to FIG. 1, gate 9, to which signal d is supplied from controller 7, receives a 32.768-KHz clock signal from oscillator 1. The clock signal output through gate 9 is supplied to multiplier 10. Multiplier 10 doubles the frequency (32.768 KHz) of the clock signals input thereto, i.e., forms a 65.536-KHz clock signal, and supplies it to generators 13a and 13b.

On the other hand, the telephone number read out from section 8 as described above is supplied to data discriminator 11 through gate g3. Discriminator 11 discriminates telephone numbers input thereto and outputs 2-bit data corresponding to the respective telephone numbers to 2-bit data memories 12a and 12b, as will be described later. 2-bit data stored in memories 12a and 12b are supplied to generators 13a and 13b, respectively. Dialing-tone waveform generators 13a and 13b divide the signals (65.536 KHz) obtained by multiplier 10 in accordance with 2-bit data to form rectangular-wave frequency signals corresponding to low and high frequencies of a dialing tone.

The rectangular-wave frequency signals output from generators 13a and 13b are converted into pseudo-sine waves by low pass filters 14a and 14b, respectively, and then supplied to adder 15 and output from loudspeaker 16 as composite dialing tones.

MULTIPLIER

FIG. 4A shows an arrangement of multiplier (actually doubler) 10 of FIG. 1 in detail, and FIGS. 4A to 4D show signal waveforms.

In FIG. 4A, the 32.768-KHz signal (FIG. 4B) output from gate 9 is supplied to exclusive OR gate 40 directly and through a plurality of inverters 41, 42, 3, and 44. Since inverters 41, 42, 43, and 44 respectively have slight delay effects between input and output signals, an output from inverter 44 at the final stage becomes a signal out of phase from the 32.768 KHz signal, as shown in FIG. 4C, and an output from gate 40 becomes a 65.536-KHz clock pulse, as shown in FIG. 4D.

Figure 5:
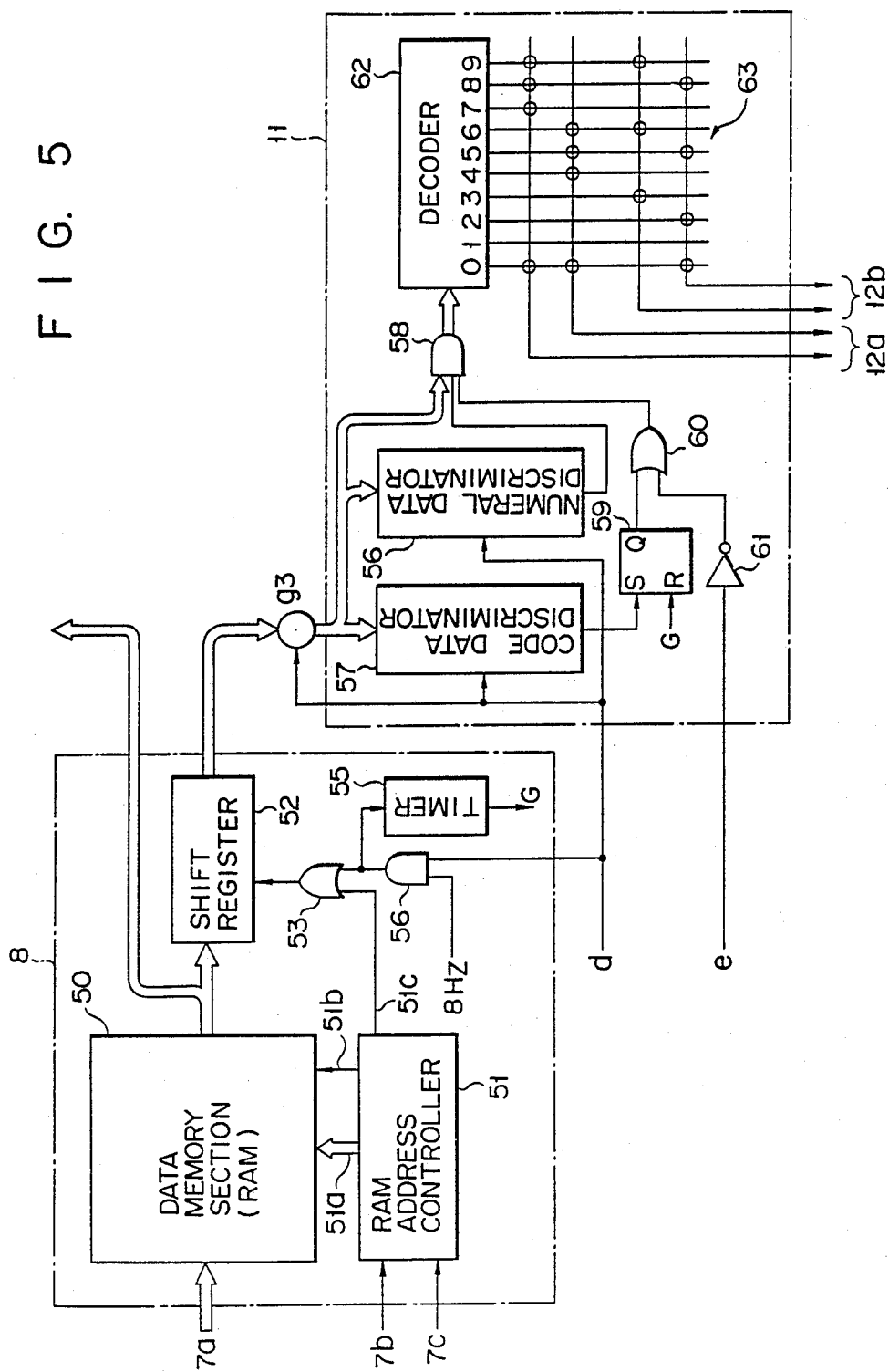
FIG. 5 is a detailed block diagram of a memory section and a data discriminator of FIG. 1.

FIG. 5 shows detailed arrangements of section 8 and discriminator 11. In FIG. 5, reference numeral 50 denotes a data memory section for storing data of names and telephone numbers output from keyboard 6A through gate 73, and consists of a RAM (Random Access Memory). In section 50, data read/write operations and addresses of data are designated by RAM address controller 51. Controller 51 includes an address register and the like (not shown) and outputs address designation signal 51a to a data memory section and also outputs read/write signal 51b. That is, when signal 7c is supplied from controller 7, controller 51 controls such that a name and a telephone number of the first person out of the names and telephone numbers of a plurality of persons are read out from section 50. In addition, when signal 7d is supplied from controller 7, controller 51 controls such that section 50 sequentially outputs names and telephone numbers of the following persons every time signal 7d is supplied. Under the control of controller 51, name and telephone number data read out from section 50 are supplied to controller 4 through gate g2 to be displayed on display 5, and also supplied to shift register 52. Register 52 has a memory area capable of storing a name and a telephone number of one person read out from section 50 and receives shift clock pulse signal 51c from controller 51 in synchronism with read out operations of every word or every numeral from section 50 so as to sequentially perform shift operations. Signal 51c from controller 51 is supplied to register 52 through OR gate 53. Gate 53 also receives signal d from controller 7 and a signal from AND gate 54 receiving the 8-Hz signal shown in FIG. 2B. An output from gate 54 is also supplied to timer 55. Timer 55 measures a time interval from the beginning to the end of the output of a dial—tone waveform signal. For example, if the number of characters and numerals stored in register 52 is about 20, the notational base of timer 55 is 20 or more. Signal G from timer 55 is used to reset each flip-flop which has been set to output the dial-tone waveform.

Name and telephone number data from register 52 are supplied to numeral data discriminator 56, code data discriminator 57, and AND gate 58 of discriminator 11, respectively, through gate g3. Discriminator 56 discriminates whether supplied data is numeral data and, only when the data is numeral, supplies a gate enable signal to AND gate 58. Discriminator 57 discriminates whether supplied data is code data and, only when the data is code, supplies a set signal to flip-flop 59.

An output signal from set output terminal Q of flip-flop 59 is supplied to gate 58 through OR gate 60. In addition, signal e from controller 7 is supplied to gate 60 through inverter 61.

An output signal from gate 58 is supplied to decoder 62 and decoded therein. Decoder 62 decodes numeral data supplied from gate 58 to output different signal lines 0 to 9 corresponding to respective numeral data. Outputs from lines 0 to 9 are supplied to decoder 63 and converted into two pieces of 2-bit signal data. Two pieces of 2-bit data correspond to the frequency signals of dialing tones to be output with respect to the respective numerals. The relationship between frequency signals of dialing tones to be output and 2-bit data is as follows.

TABLE 3

| To 2-bit data memory 12a | | To 2-bit data memory 12b | |
| --- | --- | --- | --- |
| 697 Hz | (0, 0) | 1,209 Hz | (0, 0) |
| 770 Hz | (0, 1) | 1,336 Hz | (0, 1) |
| 852 Hz | (1, 0) | 1,477 Hz | (1, 0) |
| 941 Hz | (1, 1) | 1,633 Hz | (1, 1) |

For example, in the case of numeral 0, since a 941-Hz signal and a 1336-Hz signal are used, 2-bit data of (1,1) and (0,1) are supplied to memories 12a and 12b, respectively.

Dial-Tone Waveform Generator

Figure 6:
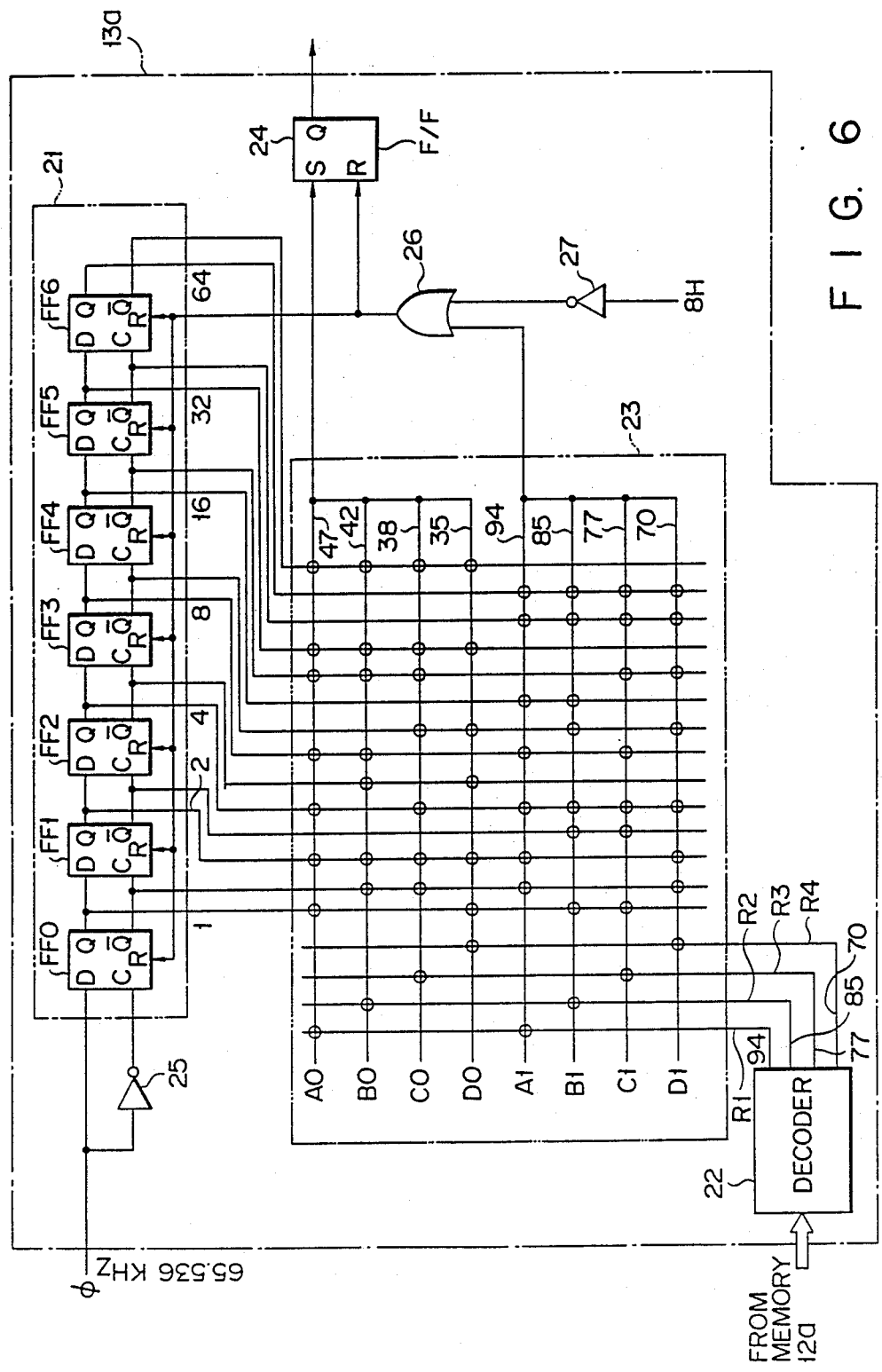
FIG. 6 is a detailed block diagram of a dial-tone waveform generator of FIG. 1.

FIG. 6 shows a detailed arrangement of dial-tone waveform generator 13a.

In FIG. 6, counter 21 consists of 7 flip-flops $FF_0$ to $FF_6$. The clock signal (65.536 KHz) obtained by multiplier 10 in FIG. 1 is supplied to input terminal D of flip-flop $FF_0$, and the waveform of the opposite phase supplied through inverter 25 is supplied to clock terminal C of flip-flop $FF_0$, so that counter 21 sequentially counts the 65.536-KHz signals.

In this embodiment, count values of counter 21 consisting of 7 flip-flops $FF_0$ to $FF_6$ are varied in accordance with dialing values to obtain frequency signals of dial-tone waveforms.

The relationship between frequency signals (F/N), the number of frequency dividing stages (N), and frequency errors is shown in Table 4 below.

TABLE 4

| | FREQ (Hz) | | 65.536 KHz | | |
|---|---|---|---|---|---|
| | | | F/N | N | ΔF % |
| Low | R1 | 697 | 697.2 | 94 | +0.029 |
| Fre- | R2 | 770 | 771.0 | 85 | +0.13 |
| quency | R3 | 852 | 851.1 | 77 | −0.106 |
| Group | R4 | 941 | 936.2 | 70 | −0.51 |
| High | C1 | 1209 | 1213.6 | 54 | +0.38 |
| Fre- | C2 | 1336 | 1337.5 | 49 | −0.112 |
| quency | C3 | 1477 | 1489.5 | 44 | +0.85 |
| Group | C4 | 1633 | 1638.4 | 40 | +0.33 |

Thus, according to this embodiment, counter 21 divides the input by the dividing numbers (ratio) represented by N in Table 4 to obtain frequency signals with extremely small frequency errors.

An operation of counter 21 for dividing by the dividing numbers represented by N in Table 4 will be described below.

Decoder 22 receives 2-bit data (0,0), (0,1), (1,0), or (1,1) supplied from memory 12a, and outputs output signal R1, R2, R3, or R4 in correspondence to respective 2-bit data. Signals R1, R2, R3, and R4 correspond to the dividing numbers 94, 85, 77, and 70, respectively.

Detector 23 has a matrix arrangement and detects the count of counter 21 in accordance with an output signal from decoder 22. When the count is equal to a predetermined number, detector 23 sets or resets flip-flop 24 or resets counter 21. For example, when signal R1 is output from decoder 22 and Q outputs of flip-flops $FF_0$ to $FF_5$ in counter 21 go to H (High) level, i.e., the count of counter 21 becomes 47, which is half that of dividing number 94, this is detected to cause signal line $A_0$ to output a signal, and flip-flop 24 is set. When Q outputs from flip-flops $FF_1$ to $FF_6$ go to a H-level, i.e., the count becomes 94, thereafter, this is detected to cause signal line A1 to output, and flip-flop 24 and counter 21 are reset through OR gate 26. Gate 26 receives the 8-Hz rectangular-wave signal shown in FIG. 2C through inverter 27. Therefore, an output from inverter 27 becomes as shown in FIG. 2D to maintain flip-flop 24 in a reset state during 62.5 msec, i.e., the last half of the 125 msec (milliseconds) period of the 8-Hz signal. That is, a dial-tone waveform is output for 50 msec or more with respect to one dial value, and the next dial-tone waveform must be output after an interval of 30 msec or more with respect to the next dial value. In addition, an output time and an interval must be 120 msec or more with respect to one dial value. Therefore, in this embodiment, an 8-Hz signal is used to output one dial-tone waveform every 125 msec, and the output time and the interval are 64.5 msec, respectively. When a signal output from decoder 22 is R2 and the dividing number is an odd number, e.g., 85, if the count becomes 42, smaller than half that of the dividing number by one, this is detected (signal $B_0$) to set flip-flop 24, and if the count becomes 85 thereafter, this is detected (signal $B_1$) to reset flip-flop 24 and counter 21. Similarly, when the dividing number designated by decoder 22 is 77 or 70 and the count is 38 or 35, respectively, this is detected (signal $C_0$ or $D_0$) to set flip-flop 24. When the count becomes 77 or 70 (signal $C_1$ or $D_1$), this is detected to reset flip-flop 24 and counter 21.

Therefore, the 65.536-KHz clock signal obtained by multiplier 10 is divided in accordance with the dividing numbers (94, 85, 77, and 70) designated by decoder 22 and is output from Q output terminal of flip-flop 24 as a rectangular wave. An example of the rectangular wave is represented by a solid line in FIG. 7A.

The rectangular wave obtained by flip-flop 24 is smoothed through low-pass filter 14a and output as a pseudo-sine wave as represented by a broken line in FIG. 7A.

On the other hand, dial-tone waveform generator 13b, for receiving 2-bit data from memory 12b shown in FIG. 1 so as to form dial-tone waveform signals corresponding to 1,209 Hz, 1,336 Hz, 1,477 Hz, and 1,633 Hz, is not shown in detail, but has the same arrangement as that of generator 13a. That is, generator 13b divides the 65.536-KHz clock signal in accordance with the designated dividing numbers (54, 49, 44, and 40) to form a rectangular wave, as represented by a solid line in FIG. 7B. The rectangular wave is smoothed through low-pass filter 14b and output as a pseudo-sine wave, as represented by a broken line in FIG. 7B. More specifically, generator 13b has the same arrangement as that of generator 13a, except that contents of the matrix are changed to cause output lines $A_0$, $B_0$, $C_0$, $D_0$, $A_1$, $B_1$, $C_1$, and $D_1$ of detector 23 of generator 13a to output when values of counter 21 become 27, 24, 22, 20, 54, 49, 44, and 40.

Thus, filter 14a cuts the frequency components of 1.1 KHz or more, and filter 14b cuts the frequency components of 1.7 KHz or more. Signals converted into pseudo-sine waves through filters 14a and 14b are supplied to adder 15 and output from loudspeaker 16 as composite dialing tones.

Electronic Wristwatch

FIG. 8 shows an appearance of an electronic wristwatch incorporating the circuit shown in FIG. 1. In FIG. 8, reference numeral 80 denotes a glass cover through which display 5 shown in FIG. 1 can be seen; 81, 82, and 83, external operation members for turning ON/OFF switches 6B, 6C, and S, respectively; and 84 and 85, keyboard switch 6A for inputting and storing name and numeral data of FIG. 3. Switch 84 can input two or three data with respect to one key, and switch 85 can switch input data with respect to one key. Section 86 houses loudspeaker 16 shown in FIG. 1, and section 86 is brought into contact with a receiver so that a dialing tone is supplied from loudspeaker 16 to the receiver.

Overall Operation

An overall operation of the above-described embodiment will now be described.

First, when output terminal Q of binary flip-flop 72 shown in FIG. 3 is at a high level, gate $g_1$ shown in FIG. 1 is opened, and the time obtained by time measuring circuit 3 is displayed on display 5.

FIG. 9A shows a state where 10:58 50", Monday, Dec. 30, 1986 is displayed. In order to generate the dialing tones of a telephone number of a person who is to be called, switch 6C is operated to invert an output from flip-flop 72 so as to set terminal Q at a high level. A signal from terminal Q rises to enable gate $g_2$, and signal $7c$ is output from rising edge detector 76, so that name and telephone number data of the first called person are output from data memory section 50 shown in FIG. 5, displayed on the display section through gate 10 $g_2$, and then stored in shift register 52.

Figure 10:

By operating switch 6B (FIG. 3), names and telephone numbers of additional persons are sequentially output from section 50, displayed, and then stored in register 52. Thus, by operating switches 6C and 6B, the name and telephone number of the person to be called can be selected. FIG. 9B shows a state where the name "CASIO" (registered trademark), 0425 (area code number), and 55-7211 (local call number) are displayed. The area code and local call numbers are distinguished from each other by a code display member. Member is displayed by four segments of 7-segment display members, as shown in FIG. 10. Code data for displaying member is input by keyboard 84 (the same key as mark # in FIG. 8).

Figure 11:
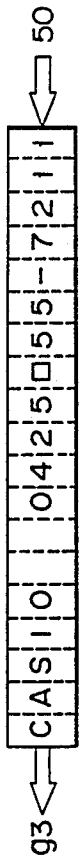
FIG. 11 is a view showing contents stored in a shift register of FIG. 5.

When CASIO and its telephone number are displayed, name data, telephone number data, and code data for CASIO are stored in register 52, as shown in FIG. 11.

To transmit the telephone number of CASIO as a dialing tone to the telephone set, switch S (FIG. 3) is operated. By operating switch S, flip-flop 79 is set. Timer circuit 81 is reset and counts the 1-Hz signal from gate 80. If the area code number need not be output, switch S is operated again before the carry signal is output from circuit 81, i.e., within 3 seconds after switch S is operated. If switch S is not operated again, the carry signal from circuit 81 sets flip-flop 81, and set signal d is output to generate dialing tones sequentially, beginning with the area code. When switch S is operated again, flip-flop 81 is cleared, and flip-flop 84 is set to output set signal e. Therefore, when signal d is output after 3 seconds, signal e is output at the same time, so that only the local call number is output, as described later.

That is, when only signal d is output, it is supplied to AND gate 56 of section 8 (see FIG. 5). Therefore, the 8-Hz signal is derived from gate 56, and data stored in register 52 are sequentially shifted and read out.

Readout data are supplied to AND gate 58 through gate $g_3$ enabled by signal d. Since character data "CASIO", stored in a front section of register 58, is not numeral data, no signal is output from numeral data discriminator 56 and hence from gate 58. When the telephone number 0425 . . . is output from register 52, a signal is output from discriminator 56 to gate 58, and an output signal from inverter 61 is supplied to gate 58 because signal e is not output. Therefore, all numeral data of 0425 . . . are supplied to decoder 62 in units of 8 Hz, and converted into dialing tones to be output.

When signal e is output at the same time to output only the local call number, no output can be obtained from inverter 61. Therefore, neither character data "CASIO" nor the area code number "0425" are output. However, when code data following "0425" is supplied, the code data is discriminated by discriminator 57. Therefore, gate 58 receives a set signal from flip-flop 59 through gate 60 and supplies the local call number following code data to decoder 62, thereby generating dialing tones.

It should be noted that signal e may be supplied to controller 4 and the area code number may be erased from the display while signal e is generated, as illustrated in FIG. 9C. In this case, it can be recognized whether dialing tones generated involve the area code number, or only the local call number. When all data are output from register 52, counter 55 having the substantially same capacity as that of register 52 outputs carry signal G to reset flip-flops 79, 82, 84, and 59, thereby completing the dialing tone generation.

Second Mode

Figure 12:
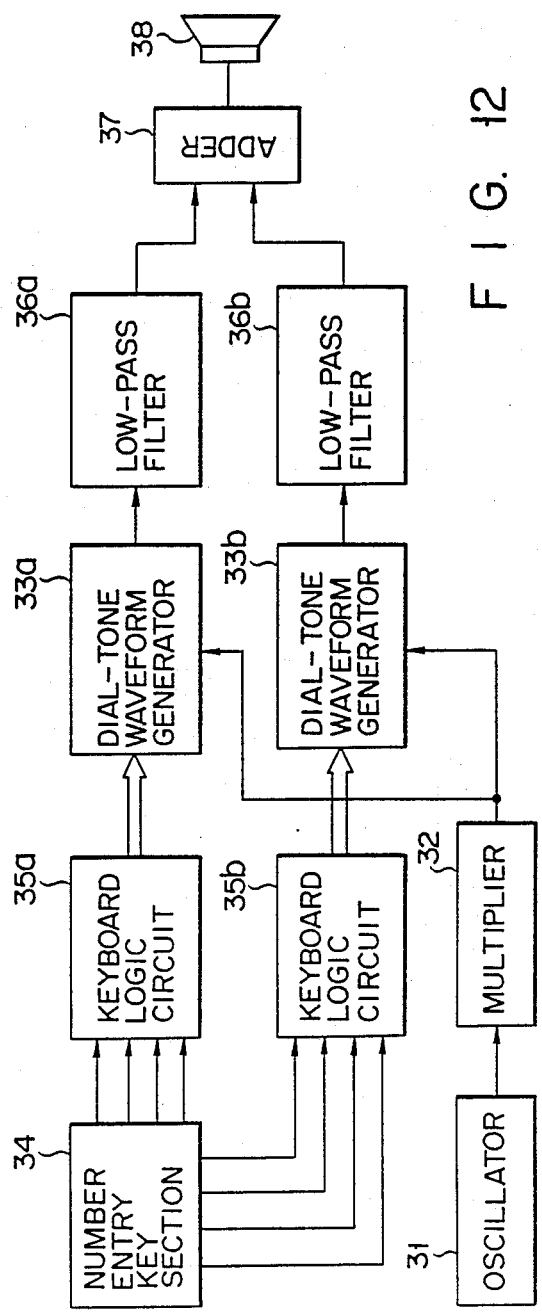
FIG. 12 is a block diagram of another embodiment of the present invention.

FIG. 12 shows a second preferred embodiment of the present invention. In FIG. 12, a circuit for displaying time is omitted to show only a major part.

In FIG. 12, clock signals of a frequency of 32.768 KHz output from oscillator 31 are doubled by multiplier (i.e., doubler) 32 to be clock signals having a frequency of 65.536 KHz and then supplied to dial-tone waveform generators 33a and 33b having the same arrangement as that of generators 13a and 13b shown in FIG. 1. On the other hand, during telephone number input by operating number entry key section 34, whenever the numbers "0" to "9" are input, 2-bit data of frequencies corresponding to numbers "0" to "9" are output from keyboard logic circuits 35a and 35b and then supplied to generators 33a and 33b. Since 2-bit data output from circuits 35a and 35b correspond to dial numbers output from discriminator 11 of FIG. 1, dial-tone waveform generators 33a and 33b divide clock signals from multiplier 32 in accordance with input 2-bit data so as to form rectangular-wave signals of a predetermined frequency, as described in the first embodiment. The rectangular-wave signals are supplied to adder 37 through low-pass filters 36a and 36b to be a composite wave, and the composite wave is output from loudspeaker 38 as a dialing tone.

In the present embodiment, since a relatively low oscillation frequency is doubled by multiplier 32 and then divided by dial-tone waveform generators 33a and 33b as in the first embodiment, error $\Delta F$ of the obtained frequency can be limited to $\pm 1.5\%$, thereby outputting a dialing tone with high accuracy.

Third Mode

FIG. 13 shows a third preferred embodiment of the present invention.

In the embodiments shown in FIGS. 1 to 12 and FIG. 13, frequency signals of a rectangular wave required for dialing tones were obtained and supplied to low-pass filters to finally obtain pseudo-sine wave signals.

However, in the embodiment shown in FIG. 13 to be described below, data ROMs (Read Only Memory) 113a and 113b instead of dial-tone waveform generators 13a and 13b, and ladder networks 114a and 114b consisting of D/A converters and low-pass filters instead of low-pass filters 14a and 14b, are employed. Therefore, in FIG. 13, the same circuit elements except ROMs 113a and 113b and networks 114a and 114b as in FIG. 1 are denoted by the same reference numerals, and a detailed description thereof will be omitted.

Figure 14:
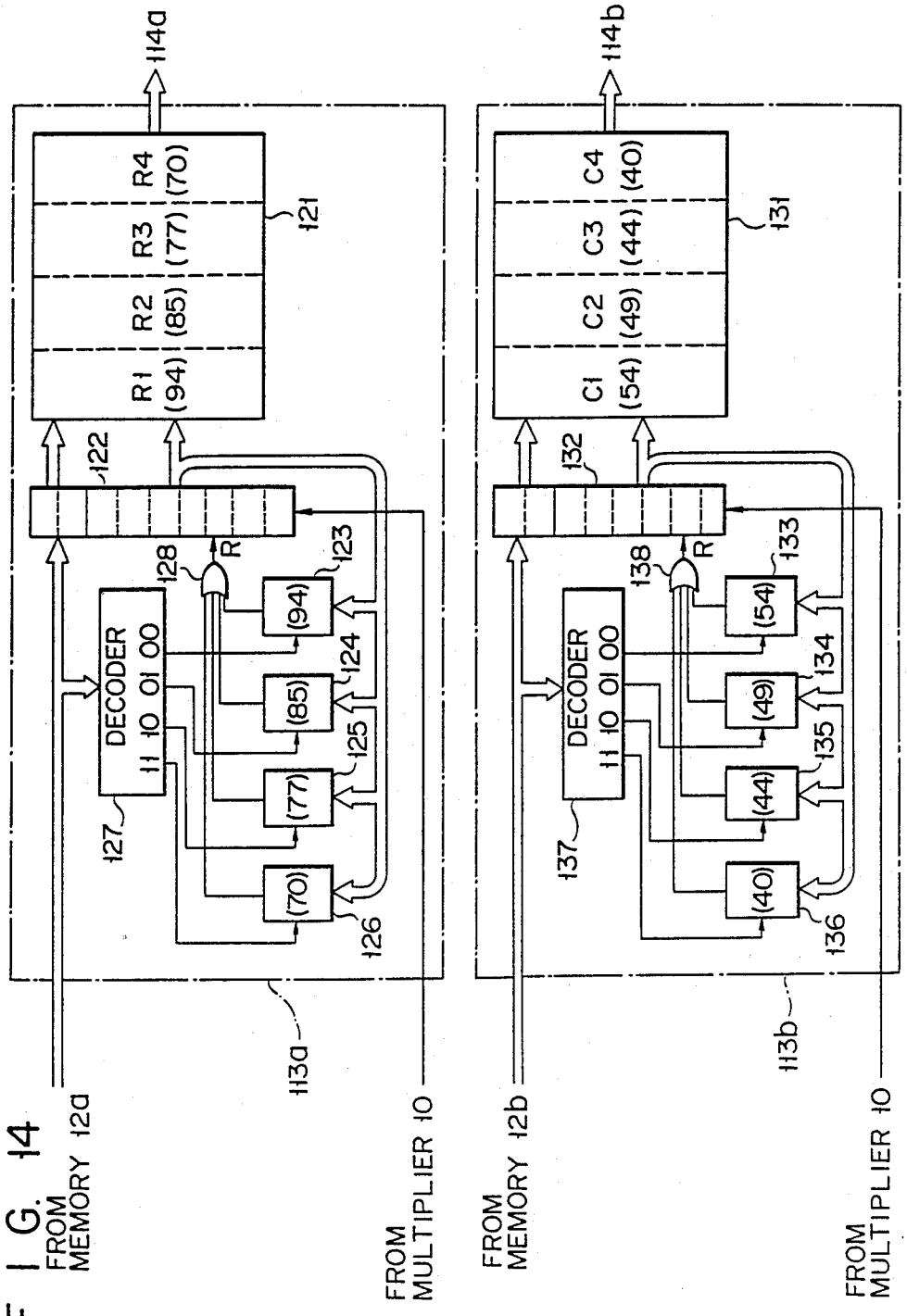
FIG. 14 is a block diagram showing details of a data ROM of FIG. 13.

Detailed arrangements of ROMs 113a and 113b are shown in FIG. 14.

In FIG. 14, data ROM 113a includes memory 121. Areas R1, R2, R3, and R4 of memory 121 store digital data groups (respectively including 94, 85, 77, and 70 pieces of data) representing the amplitudes of waveforms obtained by dividing waveforms corresponding to one cycle of sine waves of 697 Hz, 770 Hz, 852 Hz, and 941 Hz respectively by dividing numbers 94, 85, 77, and 70. Address counter 122 is a 9-bit counter, and 2-bit data from 2-bit data memory 12a is preset to higher 2 bits thereof to select one of data groups R1 to R4 corresponding to 2-bit data in memory 121. In addition, counter 122 receives clock signals of a frequency of 65.536 KHz from multiplier 10 and counts the clock, using a lower 7-bit address. Memory 121 sequentially outputs data corresponding to one of R1 to R4 designated by the higher 2 bit address of counter 122 whenever the lower 7-bit address is counted up. Furthermore, count values of the lower 7-bit address of counter 122 are respectively supplied to detectors 123, 124, 125, and 126. Decoder 127 receives 2-bit data (0,0), (0,1), (1,0), or (1,1) supplied from memory 12a and operates corresponding detector 123, 124, 125, or 126. When detector 123, 124, 125, or 126 is operated and count values of counter 122 reach 94, 85, 77, and 70, respectively, contents of counter 122 are cleared through OR gate 128.

More specifically, when 2-bit data "01", corresponding to 770 Hz, is supplied from memory 12a of ROM 113a, "01" is preset to the higher 2 bits of counter 122, and data group R2 including 85 data in memory 121 is selected. At the same time, clock signals from multiplier 10 are started to be counted at the lower 7 bits of counter 122. In accordance with the count, 85 pieces of data in the data groups of memory 121 are sequentially output from the first one. On the other hand, decoder 127 receives 2-bit data "01" and operates detector 124. When the count value reaches 85 after counter 122 starts counting, detector 124 detects the count value 85 to reset counter 122 to start counting from the beginning. Therefore, 85 pieces of data, i.e., data of one cycle for obtaining R1 signal of 770 Hz, are sequentially and repeatedly read out from memory 121.

Even if 2-bit data corresponding to R1, R3, or R4 is supplied to ROM 13a, data of one cycle for obtaining R1, R3, or R4 are sequentially and repeatedly read out from memory 121.

It should be noted that another ROM 113b has the same arrangement and operation as described above. However, since ROM 113b operates in accordance with 2-bit data corresponding to high frequency groups 1,209 Hz, 1,336 Hz, 1,477 Hz, and 1,633 Hz, data groups of one cycle of the respective frequencies are stored in areas C1 to C4 of memory 131, and values detected by detectors 133 to 136 are 54, 49, 44, and 40 equal to the piece number of data included in the respective data group areas.

FIGS. 15A and 15B show waveforms obtained by ROMs 113a and 113b as described above, e.g., waveforms of one cycle respectively corresponding to 770 Hz and 1,136 Hz. As described above, the 770-Hz waveform is constituted by 85 pieces of data in a stepwise manner, and the 1,336-Hz waveform is constituted by 49 data in a stepwise manner. Since time interval T of one data is equal to the time interval of one clock pulse period of the clock signal obtained by multiplier 10, 770-Hz and 1,336-Hz waveforms are equal to those obtained by dividing the clock signal by 85 and 49. This is the same as for the other waveforms. Therefore, the desired frequency (F/N), as shown in Table 4, can be obtained from ROMs 113a and 113b with respect to frequency F (=65.536=2>32.768 KHz), and errors AF all fall within ±1.5%.

Stepwise waveforms obtained by ROMs 113a and 113b are digital-to-analog converted into analog signals by ladder networks 114a and 114b shown in FIG. 13 and supplied to adder 15 to produce a composite wave. The composite wave is output from loudspeaker 16 as a dialing tone.

FIG. 16 shows still another embodiment using data ROMs and ladder networks as described above. In this embodiment, ROMs 113a and 113b are used instead of dial-tone waveform generators 33a and 33b, and networks 114a and 114b are used instead of low-pass filters 36a and 36b. In an arrangement of FIG. 16, whenever dial numbers are operated by number entry key section 34, dialing tones corresponding to the respective numbers are output from loudspeaker 38.

It should be understood that in the above embodiments, read operations of names and telephone numbers from memory section 8 were sequentially performed whenever switch 6B was operated. However, names or initials of names may be input from keyboard 6A to directly read out the telephone numbers corresponding to the names.

In addition, timer circuit 81, for determining whether or not an area code number is to be output, is not limited to 3 seconds, but may be arbitrarily preset, and the interval may be announced by an alarm sound.

Furthermore, during generation of dialing tones, numerals corresponding to the output dialing tones may be displayed by flashing, and the output numerals may be erased.

What is claimed is:

1. A dialing tone generator-equipped electronic wristwatch comprising:
   oscillator circuit means for producing an oscillator frequency signal having a frequency of about 32 KHz;
   time-measuring means for frequency-dividing the oscillator frequency signal from said oscillator circuit means, to obtain time information;
   display means for displaying the time information obtained by said time-measuring means;
   multiplier means for multiplying the oscillator frequency signal of about 32 KHz, to derive a multiplier reference signal;
   memory means for storing a plurality of telephone number data of the dialing numbers;
   selection operation switch means for selecting desired telephone number data from said plurality of telephone number data in the memory means; and
   dialing tone signal generating means which, upon receipt of the telephone number data thus selected and a multiplier reference signal, frequency-divides the multiplier reference signal and delivers an output dialing tone signal corresponding to the telephone number data.

2. An electronic wristwatch as claimed in claim 1, wherein telephone number data stored in said memory means is composed of area code number data, local call number data, and division code data.

3. An electronic wristwatch as claimed in claim 1, wherein telephone number data stored in said memory means is composed of area code number data and local call number data, and said selection operation switch means includes first switch means for supplying both of the area code number data and local call number data to said dialing tone signal generating means and second switch means for supplying only the local call number data to said dialing tone signal generating means.

4. An electronic wristwatch as claimed in claim 3, wherein said first switch means operates at a predetermined time interval after a push button type external operation switch is operated for the first time, and said second switch means operates when said push button type external operation switch is operated again within said predetermined time interval.

5. An electronic wristwatch according to claim 1, further including display control means for switchingly displaying, on said display means, telephone number data which is selected by said selection operation switch means.

6. A dialing tone generator-equipped electronic wristwatch, comprising:
 oscillator circuit means for producing an oscillation signal having a predetermined frequency;
 dividing means for outputting a reference frequency signal, including means for frequency-dividing said oscillation signal of said predetermined frequency to produce said reference frequency signal;
 display means for displaying time information based on said reference frequency signal;
 multiplier means for multiplying the oscillator frequency signal having said predetermined frequency, to provide a multiplier reference signal;
 memory means for storing a plurality of telephone number data corresponding to telephone numbers to be dialed;
 selection operation switch means for selecting desired telephone number data from said plurality of telephone number data in said memory means; an dialing tone signal generating means responsive to the selected telephone number data and said multiplier reference signal, for frequency-dividing said multiplier reference signal and for delivering an output dialing tone signal corresponding to the telephone number data.

7. An electronic wristwatch as claimed in claim 6, wherein said memory means is adapted to store said telephone number data in the form of area code number data, local call number data, and division code data.

8. An electrode wristwatch as claimed in claim 6, wherein said memory means is adapted to store said telephone number data in the form of area code number data and local call number data, and said selection operation switch means includes first switch means for supplying both of the area code number data and the local call number data to said dialing tone signal generating means, and second switch means for supplying only the local call number data to said dialing tone signal generating means.

9. An electronic wristwatch as claimed in claim 8, wherein said first switch means is adapted to operate in a predetermined time interval after an external push button type operation switch is operated a first time, and said second switch means is adapted to operate when the external push button type operation switch is operated again within said predetermined time interval.

10. An electronic wristwatch according to claim 6, including display control means for successively displaying on said display means, telephone number data that is selected by said selection operation switch means.

* * * * *